United States Patent [19]

Young et al.

[11] Patent Number: 5,469,403

[45] Date of Patent: Nov. 21, 1995

[54] DIGITAL SONAR SYSTEM

[75] Inventors: Kenneth K. Young; R. Jeffrey Wilkes, both of Seattle, Wash.

[73] Assignee: Board of Regents of the University of Washington, Seattle, Wash.

[21] Appl. No.: 929,881

[22] Filed: Aug. 11, 1992

[51] Int. Cl.⁶ ............................................. H04B 1/59
[52] U.S. Cl. ............................ 367/6; 367/125; 367/134
[58] Field of Search ................................ 367/2, 6, 125, 367/127, 134, 99; 364/561, 569; 375/6

[56] References Cited

U.S. PATENT DOCUMENTS

| | | | |
|---|---|---|---|
| 3,786,405 | 1/1974 | Chramlec et al. | 340/3 R |
| 4,097,837 | 6/1978 | Cyr | 367/6 |
| 4,287,578 | 9/1981 | Heyser | 367/88 |
| 4,442,513 | 4/1984 | Mead | 367/101 |
| 4,472,793 | 9/1984 | Benjaminson | 367/102 |
| 4,712,201 | 12/1987 | Lagier | 367/92 |
| 5,025,423 | 6/1991 | Earp | 367/137 |

OTHER PUBLICATIONS

Schock et al., "Sediment Classification Using a Wideband, Frequency–Modulated Sonar System," Offshore Technology Conference, May 1986.

Aoki et al., "Acoustical Positioning System For Dumand–II," Proceedings of 22nd International Cosmic Ray Conference, Aug. 11–23, 1991.

Primary Examiner—Daniel T. Pihulic
Attorney, Agent, or Firm—Stoel Rives Boley Jones & Grey

[57] ABSTRACT

A transponder of an active digital sonar system identifies a multifrequency underwater activating sonar signal received from a remote sonar transmitter. The transponder includes a transducer that receives acoustic waves, including the activating sonar signal, and generates an analog electrical receipt signal. The analog electrical receipt signal is converted to a digital receipt signal and cross-correlated with a digital transmission signal pattern corresponding to the activating sonar signal. A relative peak in the cross-correlation value is indicative of the activating sonar signal having been received by the transponder. In response to identifying the activating sonar signal, the transponder transmits a responding multifrequency sonar signal.

25 Claims, 3 Drawing Sheets

5,469,403

DIGITAL SONAR SYSTEM

This invention was made with government support under grant number DE-FG06-9IER40614 awarded by the Department of Energy. The government has certain rights in the invention.

TECHNICAL FIELD

The present invention relates to digital sonar systems and, in particular, to an active digital sonar system employing multifrequency sonar tones.

BACKGROUND OF THE INVENTION

Many conventional sonar systems transmit a brief, single-frequency acoustic tone, often referred to as a ping, that is reflected from a passive target back to the originating source of the ping (e.g., a ship). The distance between the ship and the target corresponds to the time elapsed between transmission of the original ping and receipt of the reflected ping. The sonar system includes a transducer that converts between analog electrical signals and acoustical energy in the water. An analog signal processor employs a narrow bandpass filter and a threshold detector to identify the reflected ping as any signal having the single frequency and a magnitude greater than a preset threshold.

Such single-frequency sonar systems suffer from several disadvantages. For example, reliance on mere threshold detection of a signal is limited by the abundant background acoustic noise in water. Moreover, the analog signal processor is often unable to discern the ping reflected from the intended target from extraneous ping reflections from other targets such as an ocean bottom or other nearby vessels. Furthermore, the theoretical accuracy of threshold detection-type sonar ranging in a completely quiet environment is limited to the wavelength of the single frequency, with higher frequency (shorter wavelength) signals providing increased accuracy. Because higher-frequency acoustic signals suffer greater absorption in water, the use of high frequencies is limited to shorter ranges. In a completely quiet environment, a 10 kHz ping could theoretically have an accuracy of 15 cm for ranges of 5–10 km, and a 100 kHz ping could have an accuracy of 1.5 cm for a range of about 0.5 km.

As used in practical applications in ocean waters, however, threshold detection of single-frequency pings has an accuracy that is about 10 times worse than the accuracy expected in an idealized quiet environment. This degradation of accuracy stems from the use of signal filtering to distinguish the ping from background noise in the water. The usual frequency filtering process, together with environmental background noise, magnifies the uncertainty in the range measurement. Typically, long baseline sonar, which employs frequencies of about 10 kHz, has a practical measurement uncertainty of several meters. The magnified uncertainty introduced by the filtering and thresholding processes is basically a manifestation of a fundamental mathematical principle (i.e., the Heisenberg Uncertainty Principle) requiring that the product of uncertainties in frequency and position must exceed a fixed minimum value. Frequency-based signal filters having narrower bandwidths to avoid noise introduce larger ranging uncertainties.

To improve range resolution and to discriminate against clutter and extraneous signal reflections, some sonar systems transmit a brief multifrequency acoustic tone, which is often referred to as a chirp or pseudo-chirp. For example, U.S. Pat. No. 4,442,513 of Mead describes a sonar transceiver system that transmits four consecutive closely-spaced tones as a pseudo-chirp that is directed to and reflected from a passive target. Although it overcomes some of the limitations of conventional sonar, it suffers the inherent problems of frequency filtering and threshold detection described above. In addition, the Mead system necessarily uses a long wave train of over 0.5 sec duration and sonar signals of very high frequencies, thereby limiting the usefulness of the system in many applications. Specifically, the high frequency sonar signals limit the range of the system and the long wave train causes multipath signals from reflections to be difficult to interpret.

SUMMARY OF THE INVENTION

An object of the present invention is, therefore, to provide an active digital sonar system.

Another object of this invention is to provide such a system that employs multifrequency sonar signals to increase accuracy and resolution.

A further object of this invention is to provide such a system that employs multiple remotely-activated digital sonar transponders to accurately locate a desired object.

Still another object of this invention is to provide a system that can provide accurate ranging information for long ranges in the presence of expected environmental noise and multipath signals.

In a preferred embodiment, a transponder of the active digital sonar system of the present invention identifies a multifrequency underwater activating sonar signal received from a remote sonar transmitter. The transponder includes a transducer that receives acoustic waves, including the activating sonar signal, and generates a corresponding analog electrical receipt signal. The received analog signal is digitized and cross-correlated with a digital transmission signal pattern corresponding to the activating sonar signal. A relative peak in the cross-correlation value is indicative of the activating sonar signal having been received by the transponder.

A feature of this invention is the use of digital correlation techniques rather than conventional analog filtering and threshold detection methods. The digital correlation technique of this invention uses the complete multifrequency signal pattern with all its information content, rather than merely detecting the leading edge of a ping. As a result, the precision with which the sonar signal arrival time is determined is on the order of 10 microseconds rather than several milliseconds, the latter of which is characteristic of conventional systems. This amounts to an increase in timing precision of two orders of magnitude (i.e., a factor of 100), which provides much improved ranging precision as well as robust signal detection in the presence of noise and multipath reflected signals.

Another advantage of the correlation technique employed in the present invention is that different multifrequency sonar patterns employing the same frequency range are distinguishable. For example, a sonar signal with its frequency swept up at a constant rate from 10 to 20 kHz is distinguishable from a sonar signal with its frequency swept down from 20 to 10 kHz, and both these signals are distinguishable from sonar signals with non-constant rates of frequency sweeping over the same range.

In another embodiment of this invention, the use of two or more receiving hydrophones with fixed spacing, for example, separated by 2 to 5 meters on a rigid bar, forms a phased array and permits determination of the bearing of a transmitting source as well as its range. This is accomplished by using the highly precise determination of pulse arrival time at the two or more hydrophones to triangulate on the transmitting source location.

The active sonar system of this invention employs compact, low-power digital circuitry that is capable of submerged, independent operation for extended periods (e.g., multiple years). As a result, multifrequency sonar signals may be employed in active sonar transponders that remain submerged for sufficient periods to provide dependable navigational guides that are extremely accurate (e.g., to within 5 cm) over ranges of several kilometers. For example, Remotely Operated Vehicles and Unmanned Underwater Vehicles used in underwater drilling, construction and salvage can employ the active sonar system to operate with improved precision. Similarly, the active sonar system can locate precisely the locations of relatively small, deep-water scientific equipment to provide improved experimental capabilities.

Additional objects and advantages of the present invention will be apparent from the following detailed description of a preferred embodiment thereof, which proceeds with reference to the accompanying drawings.

DETAILED DESCRIPTION OF PREFERRED EMBODIMENTS

Figure 1:
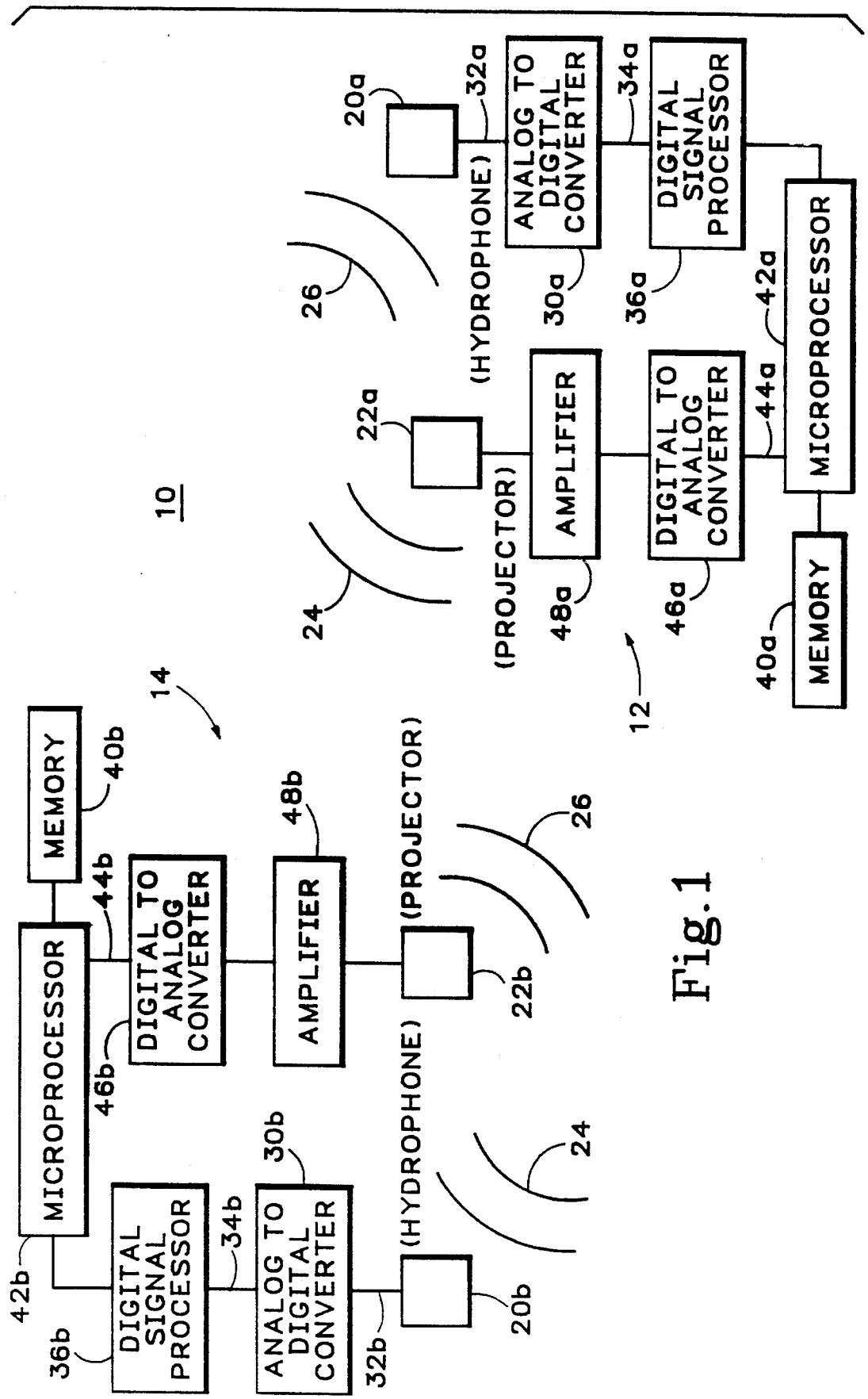
FIG. 1 is a simplified block diagram of a pair of communicating digital sonar transponders of the present invention.

FIG. 1 is a block diagram of an active digital sonar system 10 with a responding transponder 12 and an activating transponder 14 in acoustic communication through water. Transponders 12 and 14 preferably have generally similar configurations. Accordingly, common elements in transponders 12 and 14 are assigned common reference numerals and the respective suffices "a" and "b". The following description is directed primarily to transponder 12, but is similarly applicable to transponder 14.

Responding transponder 12 includes a hydrophone 20a for receiving underwater acoustic signals and a projector 22a for transmitting acoustic signals. Projector 22a transmits a multifrequency responding sonar signal 24 to transponder 14 in response to a multifrequency activating sonar signal 26 received by hydrophone 20a from transponder 14. Preferably, the sonar signals ramp through a predetermined range of frequencies between 6 and 34 kHz (e.g.,10 to 20 kHz) over a period of about 0.66 msec and are sometimes referred to as chirps. Sonar signals employing this frequency range are desirable because they have a discernible propagation distance of 5 to 10 km.

Hydrophone 20a generates an analog electrical receipt signal corresponding to the acoustic waves impinging thereon, including the acoustic waves of activating sonar signal 26 from transponder 14. An analog-to-digital converter 30a receives the analog electrical receipt signal at an input 32a, samples the analog electrical receipt signal at a frequency of about 130 kHz and generates a corresponding digital receipt signal at an output 34a. The digital receipt signal includes a 12-bit digital receipt value for each sample of the analog electrical receipt signal. Hydrophone 20a may be a DUMAND model hydrophone manufactured by Benthos Corp. of Falmouth, Mass., projector 22a may be a model 3217 manufactured by International Transducer Corp. (ITC) of Santa Barbara, Calif. and analog-to-digital converter 30a may be a model AD678 manufactured by Analog Devices, Inc. of Norwood, Mass.

A digital signal processor 36a receives the digital receipt signal from output 34a of analog-to-digital converter 30a and convolutes the digital receipt signal with a predetermined digital signal waveform 38 (FIG. 2) that corresponds to activating sonar signal 26 and is stored in a memory circuit 40a. Digital signal processor 36a generates a first-order cross-correlation value $R_{xy}$ between the digital signal waveform and successive digital receipt values generated by analog-to-digital converter 30a. Digital signal processor 36b may be a model ADSP 2101 manufactured by Analog Devices, Inc. of Norwood, Mass. Memory circuit 40a preferably employs EEPROM (electrically erasable programmable read only memory) integrated circuits, which retain data even if all power is lost, such as the NMC95C64 CMOS EEPROM made by National Semiconductor of Santa Clara, Calif.

Figure 2:
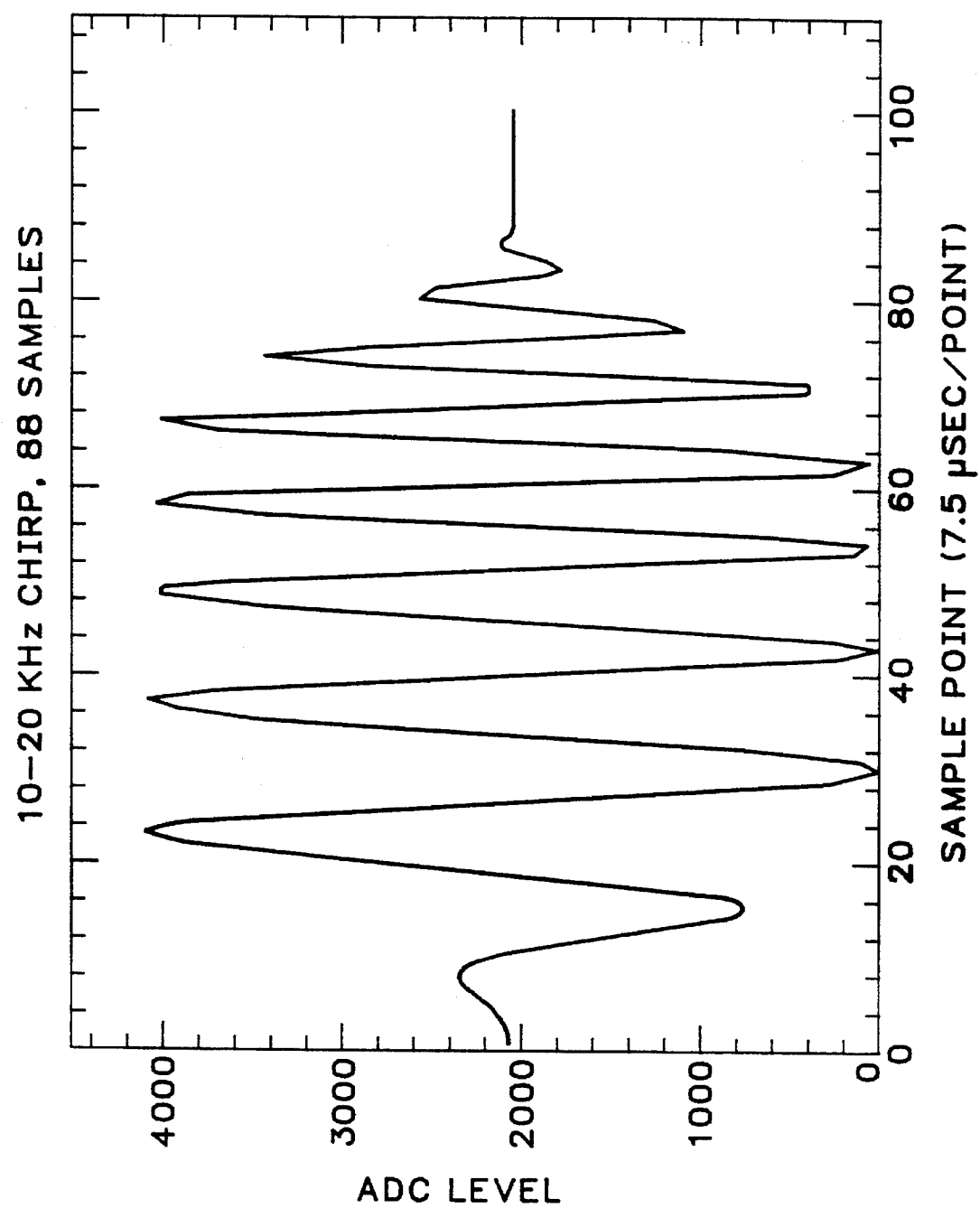
FIG. 2 is a graph of an analog electrical signal corresponding to an exemplary multifrequency sonar signal employed by the transponder of FIG. 1.

FIG. 2 is a graph showing the magnitudes of the digital values corresponding to programmable digital signal waveform 38 stored in memory circuit 40a. Waveform 38 preferably represents a brief multifrequency acoustic tone corresponding to 88 digital values and ramping in frequency from 10 to 20 kHz over a period of 0.66 msec. Waveform 38 provides a spatial resolution of about 5 cm over a propagation range of 5–10 km. The number of digital values in waveform 38 is preferably as large a number as can be quickly processed by digital signal processor 36a.

With reference to FIGS. 1 and 2, digital signal processor 36a employs 88 successive digital receipt values with the digital values of predetermined digital signal waveform 38 to compute the cross-correlation value $R_{xy}$, represented as:

$$R_{xy} = x_1 y_1 + x_2 y_2 + x_3 y_3 + \ldots + x_{88} y_{88},$$

in which the terms $x_1, x_2, \ldots, x_{88}$ represent the digital values of predetermined digital signal waveform 38 and the terms $y_1, y_2, \ldots, y_{88}$ represent the 88 successive digital receipt values.

Digital signal processor 36a delivers each cross-correlation value $R_{xy}$ to a microprocessor 42a such as, for example, a model 68332 microprocessor manufactured by Motorola of Austin, Tex. Microprocessor 42a monitors a predetermined number of successive cross-correlation values $R_{xy}$ (e.g., 88) in accordance with processing instructions stored in memory circuit 40a to identify a relative peak in the magnitudes of the cross-correlation values. Such a peak cross-correlation value is typically designated as exceeding adjacent cross-correlation values by a predetermined percentage (e.g., 70%) and indicates that activating sonar signal 26 has been received at hydrophone 20a.

Whenever it identifies a relative peak in the magnitude of the cross-correlation values $R_{xy}$ generated by digital signal processor 36a, microprocessor 42a delivers a digital transmission signal to an input 44a of a digital-to-analog converter 46a. The digital transmission signal represents multifrequency responding sonar signal 24 and includes 88 or more digital values analogous to digital signal waveform 38. However, responding sonar signal 24 preferably differs from activating sonar signal 26 to allow the two signals to be easily distinguished. For example, responding sonar signal 24 could ramp between frequencies of 20–30 kHz.

Digital-to-analog converter 46a converts the digital transmission signal to an analog electrical signal that is delivered to a power amplifier 48a, which drives projector 22a in accordance with the analog signal to form responding sonar signal 24. Responding sonar signal 24 propagates through the water to transponder 14, which employs hydrophone 20b, analog-to-digital converter 30b, digital signal processor 36b and microprocessor 42b in the manner described above to identify responding sonar signal 24. Similarly, transponder 14 transmits activating sonar signal 26 in a manner similar to that in which transponder 12 transmits responding sonar signal 24, except that activating sonar signal 26 is formed in response to a control signal from an operator.

In one embodiment of active digital sonar system 10, responding transponder 12 is located at a fixed position in water (e.g., on an ocean bottom) and activating transponder 14 is located aboard a ship or another vessel. Based upon the delay between transmitting activating sonar signal 26 and receiving responding sonar signal 24, and a predetermined responding time of about 1–10 msec during which transponder 12 identifies sonar signal 26 and transmits sonar signal 24, microprocessor 40b is capable of computing the distance between transponders 12 and 14 to within about 5 cm over a range of up to about 5–10 km. To provide precise navigational positioning, however, the sonar system employs multiple fixed responding transponders 12 at different locations or transponder 14 employs a phased array of hydrophones 20b.

Figure 3:
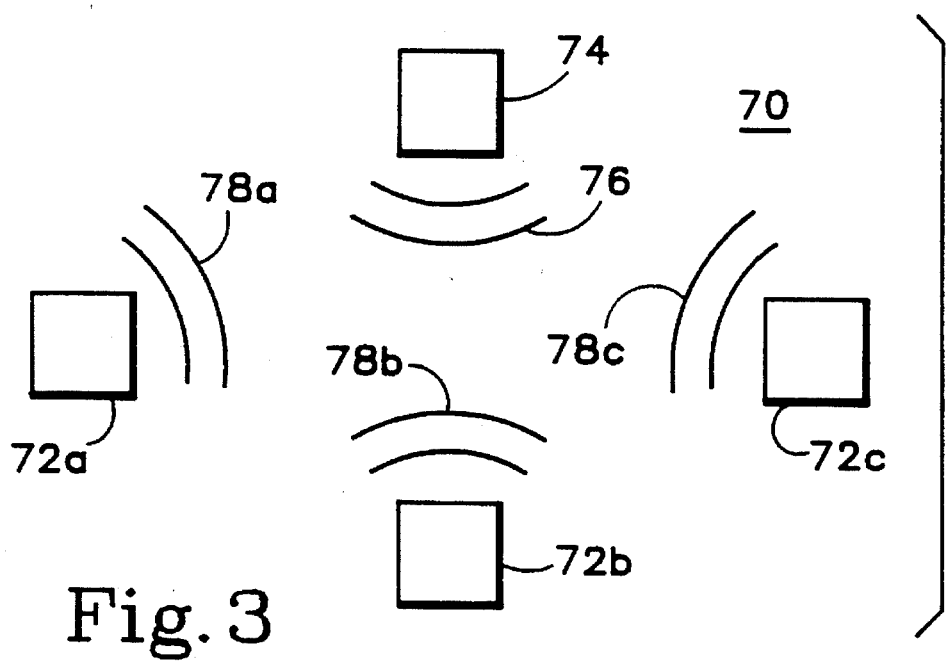
FIG. 3 is a schematic block diagram of an active sonar navigation system of the present invention employing a network of responding transponders.

FIG. 3 is a diagram of an active sonar navigation system 70 employing a network of multiple (only three shown) active digital responding transponders 72a, 72b and 72c of the present invention that have substantially fixed locations in water and are responsive to a vessel-mounted activating transponder 74. In response to a multifrequency activating sonar signal 76 transmitted by vessel-born transponder 74, transponders 72a, 72b and 72c transmit respective multifrequency responding sonar signals 78a, 78b and 78c. Transponders 72a, 72b and 72c are each powered by a lithium battery of the type manufactured by Altus Corp. of San Diego, Calif. and are capable of independent operation for periods up to about 5 years.

Transponders 72a, 72b and 72c have generally similar configurations to that of transponder 12 of FIG. 1, and transponder 74 has a generally similar configuration to that of transponder 14. Therefore, transponder 74 convolutes electrical signals representing responding sonar signals 78a, 78b and 78c with corresponding predetermined digital signal waveforms.

Preferably, responding sonar signals 78a, 78b and 78c differ from each other, and transponder 74 employs multiple parallel digital signal processors (not shown) for separately convoluting electrical signals representing sonar signals 78a, 78b and 78c with the corresponding different predetermined digital signal waveforms. Such an arrangement is desirable because it maintains the high processing speed characteristic of the present invention. Alternatively, responding sonar signals 78a, 78b and 78c are the same, but transponders 72a, 72b and 72c are responsive to different activating sonar signals 76, thereby allowing transponder 74 to activate or interrogate each of transponders 72a, 72b and 72c separately.

Frequencies can be set to allow one or more transponders to serve as relay transponders. For example, in response to an activating sonar signal from a ship-based activating transponder, a first responding transponder replies with a first sonar signal that returns to the activating transponder and that activates a second responding transponder. The second responding transponder replies with a second sonar signal that also returns to the activating transponder and can activate other responding transponders. The activating transponder can thus collect ranges to each of the responding transponders, as well as the range between them on the bottom based upon the delay between the first and second transponder replies.

In another operating mode, sonar navigation system 70 could employ a network or field of 4–6 responsive transponders of the present invention. Each of the responsive transponders determines its distance or range from the other transponders in the field in accordance with the active sonar operation described above, thereby precisely determining the relative positions of all the transponders in the field.

This system computes relative ranges on the ocean bottom using sonar signals that have travelled only horizontally near the ocean bottom, in an environment of constant sound speed. By not measuring ranges up to a surface ship, this system avoids problems of sound speed variation and sound ray refraction which contribute to positioning errors when working from the surface. They transmit their ranging determinations to the surface through an acoustical modem of a type described below, or store the determinations in on-board memory for direct access when the transponder is released and recovered.

In an analogous operating mode, an activating sonar transponder transmits a multifrequency sonar signal toward a field of 4 or more acoustic retroreflectors (not shown) positioned in water. Each retroreflector would be sized to reflect the nominal wavelength of the sonar signal (e.g., 5 cm). The transponder could determine its relative position in the manner described above based on the sonar signals reflected by the retroreflectors. Alternatively, resonating cavities tuned to different ones of the frequencies in the sonar signal could be substituted for the retroreflectors. As a result, the different resonating cavities could more easily be distinguished, thereby simplifying the determination of the relative position of the activating transponder.

Figure 4:
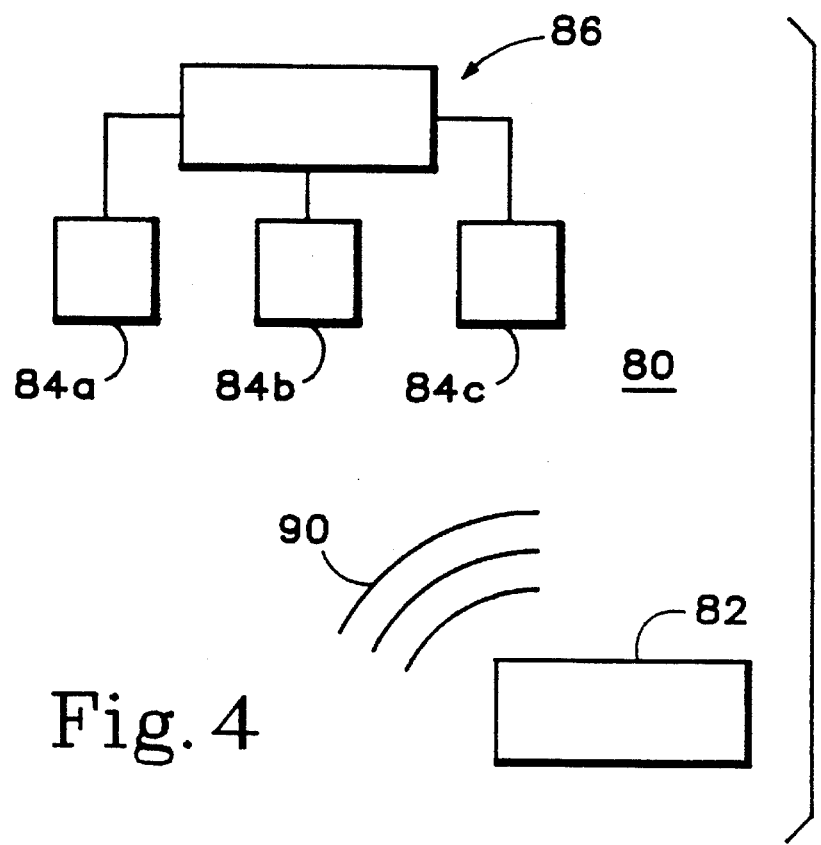
FIG. 4 is a schematic block diagram of an active sonar navigation system of the present invention employing a phased array of hydrophones.

FIG. 4 shows an active sonar positioning system 80 employing one responding transponder 82 having a substantially fixed location and a phased array of hydrophones 84a, 84b and 84c (only three shown) of an activating transponder 86. Sonar positioning system 80 may be employed to determine the position of a vessel relative to transponder 82 or the positions of scientific instruments positioned in ocean waters. In response to a multifrequency activating sonar signal transmitted by transponder 86, transponder 82 transmits a responding sonar signal 90 that is received by phased hydrophones 84a, 84b and 84c.

Transponder 86 convolutes the electrical signal generated by each of hydrophones 84a, 84b and 84c with a predetermined digital signal waveform. Responding sonar signal 90 reaches hydrophones 84a, 84b and 84c at slightly different times due to the different positions of the hydrophones. Based upon these time differences, transponder is capable of determining its position relative to transponder 82.

Transponders of the present invention can be programmed remotely by using multifrequency sonar signals of predetermined configurations to represent logic 1's and 0's of a digital communication format. For example, the configuration of the responding sonar signal may be modified remotely by transmitting suitable programming instructions via the communication sonar signals. Other transmitted commands could include, for example, operate with a common activating signal and an individual responding signal; operate with a common responding signal and an individual activating signal; sleep (i.e., go to a battery-saving state in which most circuits are off and transponder responds only to a turn-on command); and release (i.e., cut free from anchor and float to surface for recovery).

It will be appreciated, therefore, that such transponders could alternatively be employed primarily as sonar data links or modems. In such operation, digital signal transmission rates of 1200 baud can be achieved by transponders of this invention operating at 10–20 kHz over ranges of 5–10 km; rates up to 9600 baud are achievable over shorter ranges using higher frequencies.

It will be obvious to those having skill in the art that many changes may be made to the details of the above-described preferred embodiment of the present invention without departing from the underlying principles thereof. The scope of the present invention should be determined, therefore, only by the following claims.

We claim:

1. An active digital sonar system having first and second transponders in acoustic communication through water, each transponder comprising:

transducer means for transmitting a transmitted sonar signal according to an electrical analog control signal and generating an electrical analog receipt signal in response to a received sonar signal;

signal converting means in communication with the transducer means for converting the analog receipt signal to a digital receipt signal and for converting a digital control signal to the analog control signal;

pattern storage means in data communication with the signal converting means for storing and delivering to the signal converting means a digital control signal corresponding to a multifrequency sonar transmission signal; and digital signal processing means in data communication with the signal converting means and the pattern storage means for receiving and convoluting the digital receipt signal and a digital signal matching pattern corresponding to the received sonar signal.

2. The system of claim 1 in which the first transponder transmits a multifrequency activating sonar signal and the second transponder transmits a multifrequency responding sonar signal in response to receiving the activating sonar signal.

3. The system of claim 2 in which plural second transponders transmit responding sonar signals in response to the activating sonar signal and the first transponder distinguishes the responding sonar signals from the plural second transponders to determine a relative position of the first transponder.

4. The system of claim 3 in which each of the second transponders transmits a different responding sonar signal.

5. The system of claim 2 in which the first transponder includes a phased array of transducer means for generating plural analog receipt signals in response to a received sonar signal transmitted by the second transponder and the first transponder determines from the plural analog receipt signals a relative position of the first transponder.

6. The system of claim 1 in which only one of the first and second transponders is attached to a waterborne vessel.

7. The system of claim 1 in which at least one of the first and second transponders is attached to a bottom surface of a body of water.

8. The system of claim 1 in which the first and second transponders transmit and identify plural multifrequency sonar signal patterns.

9. The system of claim 1 in which the multifrequency sonar transmission signal in swept continuously over a predetermined range of frequencies.

10. An active sonar transponder responsive to an activating sonar signal transmitted through water from a remote sonar emitter, comprising:

first transducer means for generating an electrical analog receipt signal in response to received acoustic waves including the activating sonar signal;

signal converting means in communication with the transducer means for converting the analog receipt signal to a digital receipt signal;

digital signal processing means in data communication with the signal converting means for convoluting the digital receipt signal with a predetermined digital signal waveform to identify the digital receipt signal corresponding to the activating sonar signal;

responding signal generating means in communication with the digital signal processing means for generating an electrical analog responding signal whenever the digital signal processor identifies the activating sonar signal; and second transducer means for transmitting a responding sonar signal in accordance with the analog responding signal.

11. The transponder of claim 10 in which the multifrequency sonar signal includes frequencies ranging between about 6 kHz and 34 kHz.

12. The transponder of claim 10 in which the digital signal processing means computes a cross-correlation value between the digital receipt signal and the digital control signal.

13. The transponder of claim 12 in which the digital signal processing means identifies the digital receipt signal corresponding to the activating sonar signal as a relative maximum in the cross-correlation value.

14. A method of communicating acoustically through water between first and second remote acoustic transponders, comprising the steps of:

directing a multifrequency sonar signal from the first transponder toward the second transponder, the multifrequency sonar signal being formed by the first transponder in accordance with a digital control signal stored in a memory circuit;

generating at the second transponder an analog receipt signal in accordance with the multifrequency sonar signal;

converting the analog receipt signal to a digital receipt signal; and convoluting the digital receipt signal with a predetermined digital waveform signal to identify the digital receipt signal corresponding to the multifrequency sonar signal.

15. The method of claim 14 in which the first transponder transmits a multifrequency activating sonar signal and the second sonar signal transmits a multifrequency responding sonar signal in response to receiving the activating sonar signal.

16. The method of claim 14 in which the first and second transponders transmit and identify plural multifrequency sonar signal patterns.

17. The method of claim 14 in which the step of convoluting the digital receipt signal with the predetermined digital waveform signal includes computing a cross-correlation value between the digital receipt signal and the predetermined digital waveform signal.

18. The method of claim 14 in which the multifrequency sonar signal in swept continuously over a predetermined range of frequencies.

19. The method of claim 14 in which the first and second transponders are secured to a bottom surface of a body of water.

20. The method of claim 14 in which the first and second transponders are secured to respective first and second vessels.

21. The method of claim 14 in which one of the first and second transponders is secured to a vessel and the other of the first and second transponders is secured to a bottom surface of a body of water.

22. A programmable digital sonar transponder, comprising:

transducer means for transmitting a transmitted sonar signal according to an electrical analog control signal and generating an electrical analog receipt signal in response to a received sonar signal having first and second multifrequency sonar signal patterns;

signal converting means in communication with the transducer means for converting the analog receipt signal to a digital receipt signal and for converting a digital control signal to the analog control signal;

pattern storage means in data communication with the signal converting means for storing and delivering to the signal converting means a digital control signal corresponding to a multifrequency sonar transmission signal;

digital signal processing means in data communication with the signal converting means and the pattern storage means for receiving and convoluting the digital receipt signal with first and second digital signal matching patterns corresponding to the received sonar signal to identify the first and second multifrequency sonar signal patterns; and a microprocessor in data communication with the pattern storage means and the digital signal processing means and operable to identify from and implement programming instructions according to the first and second multifrequency sonar signal patterns.

23. The transponder of claim 22 in which the first and second multifrequency sonar signal patterns are swept continuously over a predetermined range of frequencies.

24. The transponder of claim 23 in which the predetermined range of frequencies is between about 6 kHz and 34 kHz.

25. The transponder of claim 22 in which the digital signal processing means computes cross-correlation values between the digital receipt signal and the first and second digital signal matching patterns.

* * * * *